United States Patent
Danko (10) Patent No.: US 9,886,642 B1
(45) Date of Patent: Feb. 6, 2018

(54) VEHICLE IDENTIFICATION NUMBER CAPTURE

(71) Applicant: United Services Automobile Association (USAA), San Antonio, TX (US)

(72) Inventor: Amanda Shannon Danko, Albany, NY (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 4 days.

(21) Appl. No.: 15/207,096

(22) Filed: Jul. 11, 2016

Related U.S. Application Data (63) Continuation of application No. 14/697,264, filed on Apr. 27, 2015, now Pat. No. 9,390,339, which is a continuation of application No. 13/722,303, filed on Dec. 20, 2012, now Pat. No. 9,036,040.

(51) Int. Cl.
| | |
|---|---|
| *H04N 5/228* | (2006.01) |
| *G06K 9/32* | (2006.01) |
| *G06K 9/00* | (2006.01) |
| *G06T 5/00* | (2006.01) |
| *G06K 9/18* | (2006.01) |

(52) U.S. Cl.
CPC ....... *G06K 9/3258* (2013.01); *G06K 9/00624* (2013.01); *G06K 9/18* (2013.01); *G06T 5/003* (2013.01); *G06K 2209/15* (2013.01); *G06T 2207/10004* (2013.01)

(58) Field of Classification Search
CPC .... G06K 9/3258; G06K 9/00624; G06K 9/18; G06K 2209/15; G06T 5/003; G06T 2207/10004
USPC ..... 348/208.1–208.8, 208.99, 208.11–208.16
See application file for complete search history.

(56) References Cited

U.S. PATENT DOCUMENTS

| | | | |
|---|---|---|---|
| 2002/0134835 A1 | 9/2002 | Kennedy | |
| 2004/0118919 A1 | 6/2004 | Breytman et al. | |
| 2006/0033825 A1* | 2/2006 | Li | G06T 5/20 348/274 |
| 2006/0082579 A1* | 4/2006 | Yao | G06T 11/00 345/473 |
| 2012/0293627 A1* | 11/2012 | Ishii | H04N 13/0011 348/46 |
| 2016/0293627 A1 | 10/2016 | Kim et al. | |

* cited by examiner

*Primary Examiner* — Yogesh Aggarwal
(74) *Attorney, Agent, or Firm* — Brinks Gilson & Lione (57) ABSTRACT

An image processing system may process an image of indicia positioned behind a reflective surface. The indicia may be a vehicle identification number and the reflective surface may be a windshield of a vehicle. The image processing system may receive an initial image of the indicia positioned behind a reflective surface and process the initial image to produce a resulting image. In processing the initial image, the image processing system may identify an interest region of the initial image, where the interest region identifies a portion of the initial image affected by glare caused by the reflective surface, texturize the interest region to account for the glare, and remove a defocusing effect from the initial image to account for blur, reflection, or both, caused by the reflective surface. Then, the image processing system may extract data, such as the vehicle identification number, from the resulting image.

17 Claims, 6 Drawing Sheets

VEHICLE IDENTIFICATION NUMBER CAPTURE

CROSS-REFERENCE TO RELATED APPLICATION

The present application is a continuation of U.S. patent application Ser. No. 14/697,264, filed Apr. 27, 2015, now U.S. Pat. No. 9,390,339, which is a continuation of U.S. application Ser. No. 13/722,303, filed Dec. 20, 2012, now U.S. Pat. No. 9,036,040, the entirety of which is hereby incorporated herein by reference.

BACKGROUND OF THE INVENTION

1. Field of the Invention

This disclosure relates to capturing a Vehicle Identification Number (VIN). This disclosure also relates to image processing techniques to extract a VIN from a digital image.

2. Description of Related Art

Vehicles, such as automobiles, may be identified according to a Vehicle Identification Number (VIN) located in the vehicle. The VIN is a character string that identifies the vehicle in various ways. The VIN can be located in various positions in the vehicle, and one common location of the VIN is on the driver side dashboard of the vehicle underneath the front windshield of the vehicle. Obtaining the VIN of a vehicle requires physically entering the vehicle or identifying the VIN through the front windshield of the vehicle. Capturing an image of the VIN may include distortions caused by the windshield. These distortions can include glare, noise, blur, and reflections caused by the windshield.

SUMMARY OF THE INVENTION

The descriptions below include methods, systems, logic, and devices for processing an image and capturing a Vehicle Identification Number. In one aspect, a method includes a processor in an electronic device receiving an initial image of indicia positioned behind a reflective surface. The processor may process the initial image to produce a resulting image by identifying an interest region of the initial image, where the interest region identifies a portion of the initial image affected by glare caused by the reflective surface, texturizing the interest region to account for the glare, and removing a defocusing effect from the initial image to account for blur, reflection, or both, caused by the reflective surface. The method further includes the processor of the electronic device extracting data that is representative of the indicia from the resulting image.

In another aspect, a device includes an image capture device and processing circuitry. The processing circuitry may be operable to capture, through the image capture device, an initial image of a vehicle identification number (VIN) positioned behind a reflective surface. The processing circuitry may process the initial image to produce a clarified image by identifying an interest region of the initial image, where the interest region identifies a portion of the initial image affected by glare caused by the reflective surface, texturizing the interest region to account for the glare, removing a defocusing effect from the initial image to account for blur, reflection, or both, caused by the reflective surface. Alternatively, the device may send the captured image to an external system to obtain the clarified image. The processing circuitry of the device may obtain an extracted VIN from the clarified image.

In another aspect, a system includes image processing logic that may be operable to receive an initial image and obtain a clarified image. The image processing logic may processing the initial image and one or more intermediate images according to the formula:

$$\mathrm{argmin} x, z \|y - Ax\|^2_2 + \|x - z\|^2_2 + \log \|z\|$$

where y represents the initial image, x represents an ideal image, z represents an interest region in the initial image, and A refers to a blur kernel.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Figure 1:
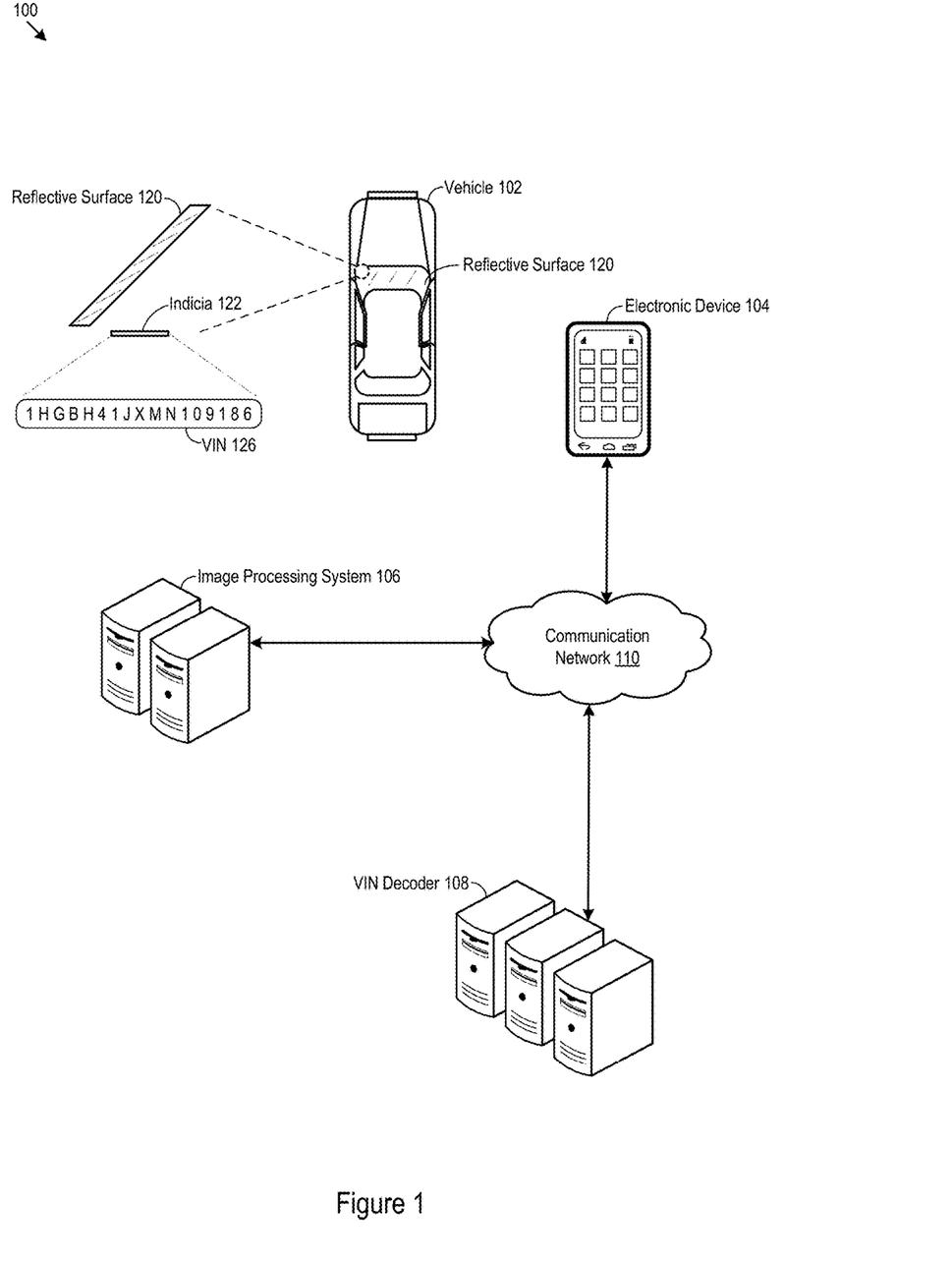
FIG. 1 shows an example of a system for vehicle identification number (VIN) capture.

FIG. 1 shows an example of a system 100 for vehicle identification number (VIN) capture. The system 100 in FIG. 1 includes a vehicle 102, an electronic device 104, an image processing system 106, and a VIN decoder server 108. The electronic device 104 may include an image capture device that captures digital images. In FIG. 1, the electronic device 104 is a mobile communication device, e.g., a cellular telephone with a digital camera. However, the electronic device 104 may take any number of forms, including as examples a laptop, digital camera, personal digital assistant (PDA), tablet device, portable music player, or others.

The electronic device 104, image processing system 106, and VIN decoder 108 may be communicatively linked through the communication network 110. The communication network 110 may include intermediate network devices or logic operating according to any communication mediums, protocols, topologies, standards, including as examples, Ethernet, cable, DSL, Multimedia over Coax Alliance, power line, Ethernet Passive Optical Network (EPON), Gigabit Passive Optical Network (GPON), any number of cellular standards (e.g., 2G, 3G, Universal Mobile Telecommunications System (UMTS), GSM (R) Association, Long Term Evolution (LTE) (TM), or more), WiFi (including 802.11 a/b/g/n/ac), WiMAX, Bluetooth, WiGig, and others.

In operation, the electronic device 104 may capture an image of indicia 122 positioned behind a reflective surface 120. The reflective surface 120 may be any semi- or fully transparent surface that may affect the capturing of an image of the indicia 112 positioned behind the reflective surface 120. In that regard, the reflective surface 120 may cause any number of distortions in the captured image of the indicia 122, such as glare, reflections, blur, noise, or others. The reflective surface 120 may be directly in contact with the indicia 122, e.g., when the reflective surface 120 is a laminated or glossy surface directly in contact with the indicia 122, such as that found on laminated identification cards (e.g., driver's licenses, credit cards, identification badges, etc.). Alternatively, the reflective surface 120 may not be in direct contact with the indicia 122, such as indicia 122 located behind and spaced apart from a windshield of a vehicle 102, as in FIG. 1. Particularly, in FIG. 1, the reflective surface 120 is a windshield of the vehicle 102 and the indicia 122 is the vehicle identification number 126 positioned at the driver side interior dash of the vehicle 102. Thus, when the electronic device 104 captures an image of the VIN 126 while outside of the vehicle 102, the reflective service 120, e.g., windshield, is located between the electronic device 104 and the VIN 126.

The electronic device 104 may send the captured image of the indicia 122 positioned behind a reflective surface 120 to the image processing system 106. As described in greater detail below, the imaging processing server 106 processes the capture image to clarify the image, e.g., by accounting for or removing distortions caused by the reflective surface 120. The image processing system 106 may extract the VIN 126 from clarified image or send the clarified image to the electronic device 104 for VIN extraction. Then, the electronic device 104 may send the VIN 126 to the VIN decoder server 108. The electronic device 104 may provide the VIN 126 to the VIN decoder 108, for example, through a web browser or a VIN capture and/or decoding software application ("app") installed on the electronic device 104, as a data string directly to the VIN Decoder 108, or in other ways.

The VIN decoder 108 receives the VIN 126 and may determine vehicle information associated with the VIN 126. The VIN decoder 108 may parse the VIN 126 and obtain any of the following vehicle information: model, make (manufacturer), model year, country and region, sequential number, body style, brake information, fuel consumption information, weight, driveline, engine capacity, engine series, engine type, fuel capacity, and more. In one variation, the VIN decoder 108 includes one or more vehicle databases storing the vehicle information. As one example, the VIN decoder 108 may be Internet service or website providing VIN decoding functionality, such as www.vindecoder.net. The VIN decoder 108 sends the vehicle information associated with the VIN 126 to the electronic device 104, which the electronic device 104 may present, e.g., through a user interface.

Figure 2:
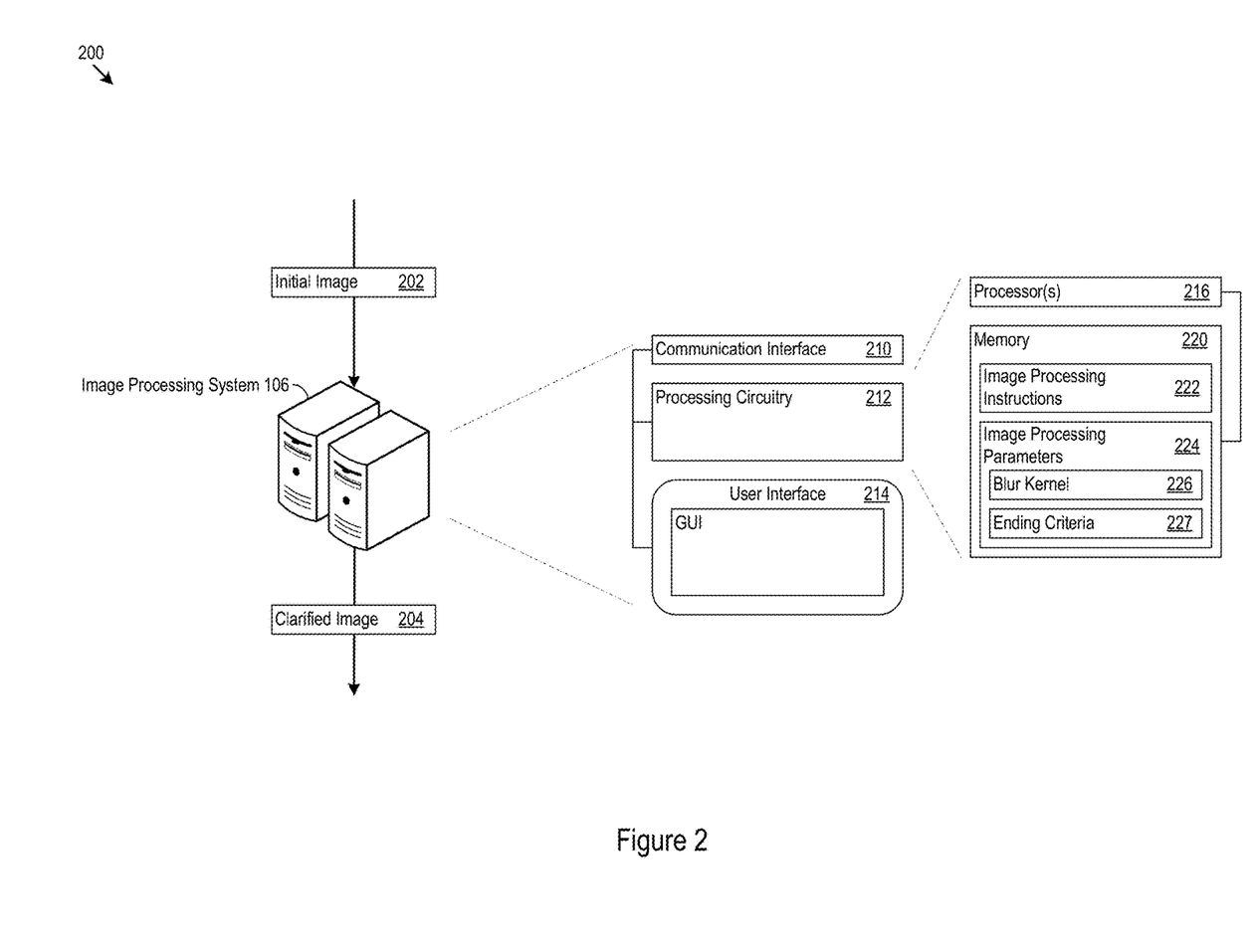
FIG. 2 shows an example of system for processing a VIN image.

FIG. 2 shows an example of a system 200 for processing a VIN image. The exemplary system 200 in FIG. 2 includes the image processing system 106. The image processing system 106 receives an initial image 202 as an input and produces the clarified image 204 as an output. The image processing system 106 may include a communication interface 210, processing circuitry 212, and a user interface 214. The processing circuitry 212 of the image processing system 106 may perform any functionality associated with the image processing system 106, including the image processes described below. In one implementation, the processing circuitry 212 includes one or more processors 216 and a memory 220. The memory may store image processing instructions 222 and image processing parameters 224. The image processing parameters 224 include, for example, a blur kernel 226 and processing ending criteria 227.

In operation, the processing circuitry 212 receives the initial image 202, which may show the VIN 126 positioned behind a reflective surface 120. The processing circuitry 212 may process the initial image 202. In particular, the processing circuitry 212 may process the initial image 202 to account for, e.g., reduce, glare, blur, reflections, noise or other distortions in the initial image 202 caused due to the positioning of the VIN 126 behind the reflective surface 120 during capture of the initial image 202.

Next, image processing techniques are presented the image processing system 106 may employ to account for the glare, blur, reflections, and/or noise in the initial image 202 caused by the reflective surface 120.

One representation of the processing employed by the image processing system 106 can be understood as:

$$y=\text{Convolve}(x,(\text{Defocused blur \& reflections}))+\text{glare}+\text{noise}$$

where y refers to the initial image and x refers to the ideal image. In one implementation, the ideal image is an image of the VIN 126 without glare, noise, blur, or reflections. According to the above, the initial image 202 may be understood as the ideal image convolved with blur and/or reflection factors and overlaid with glare and/or noise. The blur and reflections may affect high frequency ranges in the initial image 202 while the glare and noise may affect lower frequency ranges in the initial image 202. In one implementation, the image processing system 106 converts the initial image 102 to gray scale that may simply distortion reduction processing.

With enough processing power and time, the image processing system 106 may obtain ideal image x. However, for purposes of extracting the VIN 126, a result image x* may be sufficient, where result image x* may include some distortions, such as blur, reflection, glare, or noise. Thus, result image x* may be understood as:

$$x^*=\text{argmax}_x p(x|y)$$

where $\text{argmax}_x$ may refer to an iteration over x that results in the optimal probability of x* being x given y. Accordingly, by statistical analysis, x* may be proportional to:

$$\text{argmax}_x p(y|x)p(x)$$

which may be proportional to:

$$\text{argmin}_x \log [p(y|x)p(x)]$$

which, according to a least absolute shrinkage and selection operator (LASSO) technique, may be proportional to:

$$\text{argmin}_x \|y-Ax\|^2_2 + \log p(x)$$

where $\|y-Ax\|^2_2$ may have an L2 norm and A refers a reflection operator that is convolved with x. To solve the "$\text{argmin}_x \|y-Ax\|^2_2 + \log p(x)$" equation, iterations applied by the image processing system 106 may be indefinite because log p(x) may be non-convex, e.g., not possible to solve for.

To account for the indefiniteness, the image processing system 106 may introduce one or more Lagrangian multipliers to allow iterating and solving for a local minimum based on multiple values. As one example, introducing lagragian multipliers may result in the following equation:

$$\text{argmin}_{x,z} \|y-Ax\|^2_2 + \|x-z\|^2_2 + \log \|z\|$$

where z may refer to an interest region in the image x*. The interest region z may refer to the portion of the image x* affected by glare and/or noise. Thus, by introducing a Lagrangian multiplier, the image processing system 106 may remove the non-convex element "log p(x)" from the equation. Accordingly, the image processing system 106 may iterate across x and z in order to iteratively solve for x and then for z (or vice versa). By fixing interest region z in a current iteration "i", the image processing system 106 may solve for result image x* according to the following:

$$x^*_i = \text{Convolve}(x_{i-1}, k_b) + T_s(z)$$

where $k_b$ may refer to a blur kernel 226 and $T_s()$ may refer to a texture synthesis formula for texturizing the interest region z. The interest region z may be the interest region $z_i$ for the current iteration or the interest region $z_{i-1}$ for the previous iteration depending on the order the interest region z and resulting image x* are calculated for each iteration. The blur kernel 226 may take various forms, such as a Gaussian based function. The blur kernel 226 may be configured according to any number of parameters or assumptions. In one example, the blur kernel 226 may be configured to assume a maximum defocus blur constant, e.g., a max distance between the VIN 126 and the reflective surface 120. As one variation, the blur kernel 226 may include a blur detection algorithm that may dynamically determine or approximate the amount of defocus blur in the image, distance between the VIN 126 and the reflective surface 120, angle between the VIN 126 and the reflective surface 120, or other factors that affect the blur in the initial image 202 caused by the reflective surface 120. In this variation, the blur detection algorithm may supply the determined blur amount to the blur kernel 226. The texture synthesis formula $T_s(z)$ may be any texture synthesis formula and may account for glare, e.g., addressing latent glare information in the result image $x^*_{i-1}$.

Returning to iteratively solving for x* and z, by fixing x, the image processing system 106 may solve for interest region z according to the following:

$$z = x^*_i - (\log b^{-1} |\nabla x^*_i|^2)$$

where $(\log b^{-1} |\nabla x^*_i|^2)$ may specify a modified anisotropic diffusion filter and where $\nabla$ refers to the gradient magnitude. The image processing system 106 may configure the modified anisotropic diffusion filter to be reflective of the human vision and image processing. For example, the first cortical index of the human vision system that processes images after the human retina may be two dimensional and isotropic. Thus, by using a modified anisotropic diffusion filter, the image processing system 106 may diffuse noise, glare, or other lower frequency distortions in the result image $x^*_i$ and identify the interest region z. The image processing system 106 may configure the modified anisotropic diffusion filter to identify larger, e.g., significant, regions in the result image x* affected by glare as opposed to specks or relatively smaller regions in the result image x*.

The image processing system 106 may iteratively process the initial image 202 and any number of intermediate images to produce the clarified image 204. In a first iteration, the image processing system 106 processes the initial image 202 to produce a resulting image $x^*_1$, e.g., as described above. In producing the resulting image $x^*_1$ (which may be understood as the first intermediate image in the iterative process), the image processing system 106 cleans the whole image instead of just the interest region z. In doing so, the image processing system 106 may perform a contrast increase in the initial image 102, which may update the higher and/or lower contrast points in the image and clarify text in the initial image 202. The image processing system 106 may also remove defocused blur and reflections from the initial image 202, e.g., according to the blur kernel 226. The image processing system 106 may additionally or alternatively overlay a texturized interest region z, e.g., $T_s(z)$. In the initial iteration, the image processing system 106 may set the interest region $z_0$ to a predetermined initial value, e.g., none of, a predetermined portion of, or all of the initial image 202. In subsequent iterations, the interest region $z_i$ is determined as part of the iterative process.

After obtaining resulting image $x^*_1$, the image processing system 106 may identifying the interest region z in the resulting image $x^*_1$, where the interest region may identify a portion of the resulting image $x^*_1$ affected by glare caused by the reflective surface 120. As discussed above, the image processing system 106 may employ a modified anisotropic diffusive filter to analyze the resulting image $x^*_1$ and determine the region of interest. The image processing system 106 may then process the interest region $z_1$ to fill in texture and/or clean the interest region $z_1$ to address glare spots or other distortions, thus obtaining a texturized interest region to use in the subsequent iteration. The image processing system 106 may texturize the interest region z using a texturized synthesis formula, as described above. After determining and texturizing the interest region $z_1$ for the first iteration, the image processing system 106 may continue to iterate by determining resulting image $x^*_2$ based on $z_1$, $z_2$ based on $x^*_2$, and so on. In one variation, the image processing system 106 may first determine the interest z and then determine the resulting image x* for each iteration.

The image processing system 106 may iteratively process the initial image 202 and subsequent result images x* until an ending criteria 227 is satisfied. The image processing system 106 may compare resulting images between iterations to determine whether ending criteria 227 is satisfied. The ending criteria 227 may be satisfied when the resulting image $x^*_i$ of a current iteration has a lower image quality than the resulting image $x^*_{i-1}$ of the previous iteration. As examples, the image processing system 106 may compare image quality between resulting images x* of different iterations according to, as examples, signal-to-noise ratio (SNR), blur amount, other distortion amount, or other image quality metrics. As additional examples, the ending criteria 227 may be satisfied based on a threshold parameter, e.g., when a threshold number of iterations is exceeded, when the size of the interest region falls below a threshold size, etc.

The image processing system 106 may obtain the clarified image 204 when the ending criteria 227 is satisfied. As one example, the image processing system 106 may select among the resulting images $\{x^*_i, x^*_2, \ldots, x^*_i\}$ with the highest image quality according to one or more image quality metrics. As one illustration where the ending criteria 227 is satisfied when the resulting image $x^*_i$ of iteration number "i" has a lower image quality (e.g., SNR) than the resulting image $x^*_{i-1}$ of the previous iteration, the image processing system 106 may select the resulting image $x^*_{i-1}$ of the previous iteration as the clarified image 204. In this example, the resulting image $x^*_{i-1}$ may have the highest image quality (e.g., SNR) from among the resulting images x* produced during the iterative processing by the image processing system 106.

The image processing system 106 may attempt to extract the VIN 126 from the clarified image 204. For instance, the image processing system 106 may employ an Optical Character Recognition (OCR) process or other character recognition algorithm to extract the VIN 126 from the clarified image 204. When VIN extract attempt by the image processing system 106 fails, the image processing system 106 may send an error indication to the electronic device 104. In one example, the image processing system 106 determines whether the VIN extraction attempt succeeds or fails according to whether the entire VIN 126 can be successfully extracted from the clarified image 204. In one variation, the image processing system 106 may identify a failed VIN extraction attempt when a predetermined amount or portion of the VIN 126 cannot be extracted from the clarified image 204.

Figure 3:
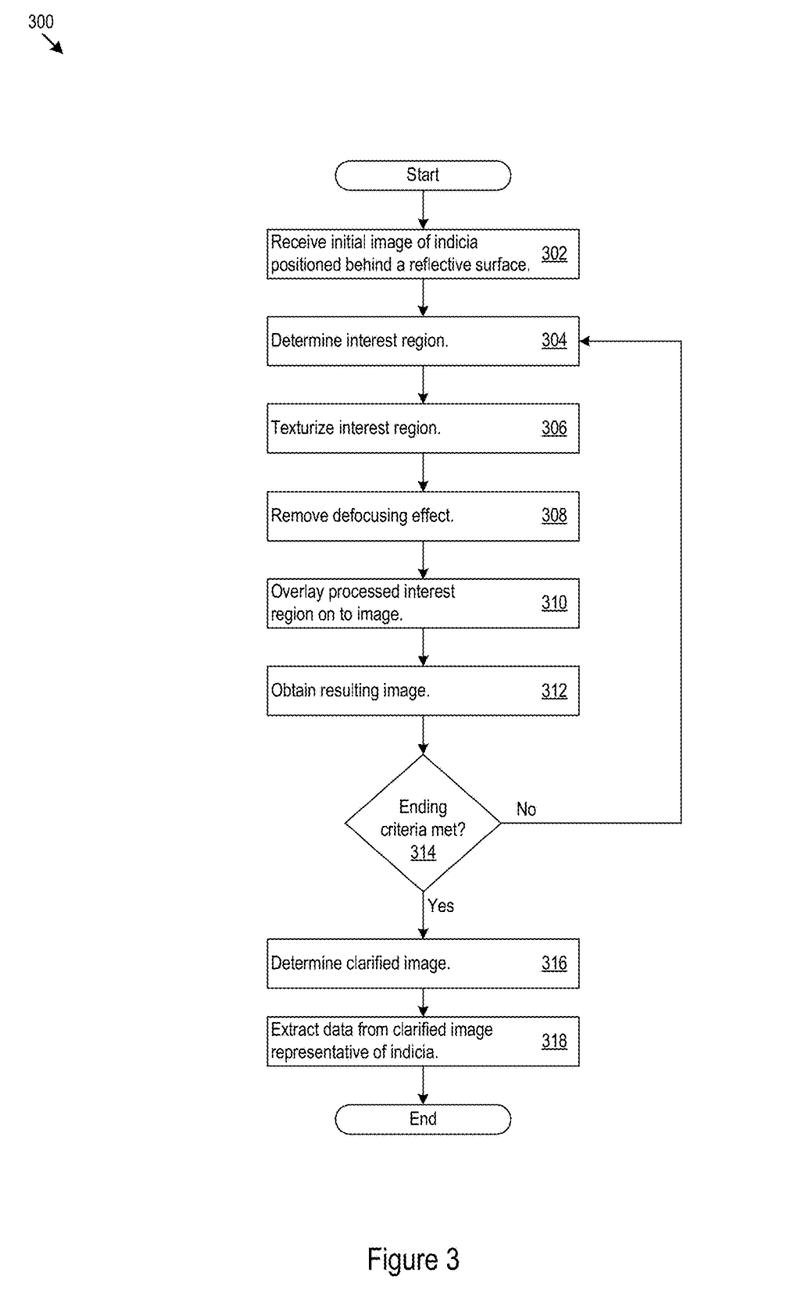
FIG. 3 shows an example of logic that may be implemented in hardware, software, or both.

FIG. 3 shows an example of logic 300 that may be implemented in hardware, software, or both. For example, the image processing system 106 may implement the logic 300 as part of the processing circuitry 212 as described below. In one variation, the electronic device 104 may implement logic 300. In another variation, the electronic device 104 and image processing system 106 may implement the logic 300 in combination.

The processing circuitry 212 may receive an initial image 202 of indicia 122 positioned behind a reflective surface 120 (302). The indicia 122 may be a VIN 126 or other indicia, such as text, an image, symbols, or combination thereof.

The processing circuitry 212 may process a particular portion of the initial image 202, e.g., the interest region z described above. The processing circuitry 212 may determine an interest region in the initial image 202 (304), for example by applying a modified anisotropic diffusion filter as discussed above. In that regard, the processing circuitry 212 may identify as the interest region one or more portions of the initial image 202 affected by glare, noise, or other distortions. The processing circuitry 212 may texturize the determined interest region (306). One option includes applying a texture synthesis formula to the interest region to account for glare or noise in the initial image 202. The processing circuitry 212 may process the interest region according to other image processing techniques to clean the interest region as well. In one embodiment, the processing circuitry 212 processes the interest region separately from the initial image 202, e.g., by creating an overlay to apply to initial image 202.

The processing circuitry 212 may process the initial image 202 as a whole, e.g., to produce the resulting image x* discussed above. In the regard, the processing circuitry 212 may reduce or remove defocusing effect(s) in the initial image 202 (308). A defocusing effect may refer to distortions in the initial image 202 that may be attributable to defocused blur and/or reflections caused by the reflective surface 120. As described above, the processing circuitry 212 may convolve the initial image 202 with the blur kernel 226 to reduce and/or remove defocusing effects in the initial image. The processing circuitry 212 may perform other processing on the initial image 202 as well, such as increasing contrast in the initial image or other processing. Then, the processing circuitry 212 may overlay the processed, e.g., texturized, interest region on to the processed initial image (310) to obtain a resulting image $x^*_i$ (312).

The processing circuitry 212 may iteratively process the resulting image x* until an ending criteria 227 is met (314). When the ending criteria 227 is met, the processing circuitry 212 may determine a clarified image 204 (316) to output from among the resulting images x* obtained during the iterative image processing prior to satisfaction of the ending criteria 227. As discussed above, the processing circuitry 212 may identify the resulting image x* with the highest image quality as the clarified image 204, e.g., according to SNR. Then, the processing circuitry 212 may extract data from the clarified image 204 representative of the indicia 122 (318). In one example, the processing circuitry 212 extracts a VIN character string from the clarified image 204.

Figure 4:
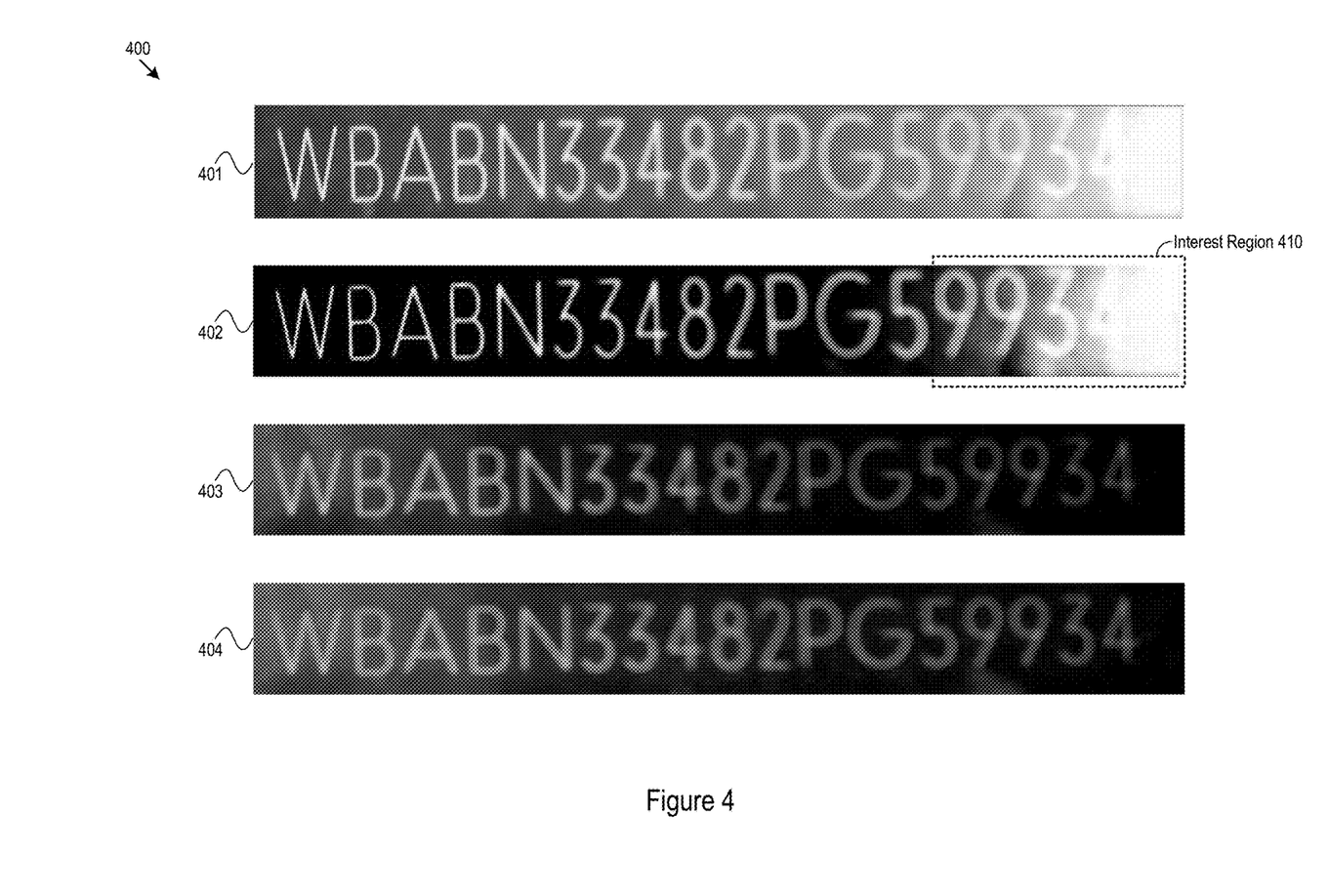
FIG. 4 shows an example of processing a VIN image.

FIG. 4 shows an example 400 of processing a VIN image. In particular, FIG. 4 shows an initial image 401, a first intermediate image 402, a second intermediate image, and a resulting image 404. The images 401-404 in FIG. 4 may depict an image through different points in the first iteration an image processing technique. The initial image 401 may depict an image captured by an electronic device 104. As seen in FIG. 4, the initial image 401 includes distorted portions, which may be caused by glare, reflections, blurring, or noise resulting from a reflective surface 120 positioned by between the indicia 122 and electronic device 104 during capture of the initial image 401. In particular, the last four digits "9934" in the initial image 401 are affected by distortion in the initial image 401. The image processing system 106 may receive and process the initial image 401.

The first intermediate image 402 may depict the result of the image processing system 106 processing the initial image 401 to address the initial image 401 as a whole. In that regard, the first intermediate image 402 may show the result of the image processing system 106 increasing the image contrast of the initial image 401, removing a defocusing effect from the initial image 401, e.g., through convolving the initial image 401 with the blur kernel 226. The first intermediate image 402 may include distortions, e.g., glare spots and/or noise, as the image processing system 106 has yet to determine or process an interest region, such as the exemplary interest region 410.

The second intermediate image 403 may show the result of the image processing system 106 processing the first intermediate image 402 to address an interest region. In that regard, the second intermediate image 403 includes a texturized interest region that has been overlaid unto the first intermediate image. Thus, the second intermediate image 403 may lack the distortion, such as glare spots, present near the last four digits "9934" in the initial image 401 and the first intermediate image 402.

The result image 404 may depict the resulting image from the first iteration in the image processing technique. As one example, the processing circuitry 212 may produce the result image 404 by performing one or more additional image processing steps on the second intermediate image 403, such as contrast enhancement, sharpening, and more.

Additional image processing may be performed to increase the effectiveness of indicia extraction, e.g., OCR. For example, contrast enhancement and sharpening of the second intermediate image 403 may allow extraction logic to extract the "3" and "4" digits at the end of the depicted VIN with a greater degree of success.

After the processing iteration, the image processing system 106 may determine whether the ending criteria 227 is satisfied. If not, the image processing system 106 may iteratively process the image, by applying similar processing steps to the result image 404 as previously applied to the initial image 401. The image processing steps and techniques described above may be performed in various orders. For example, an processing circuitry 212 may perform additional processing, such as contrast enhancement and/or sharpening, at any point in a processing iteration, e.g., before or after addressing the interest region, before or after addressing the image as whole, etc.

Figure 5:
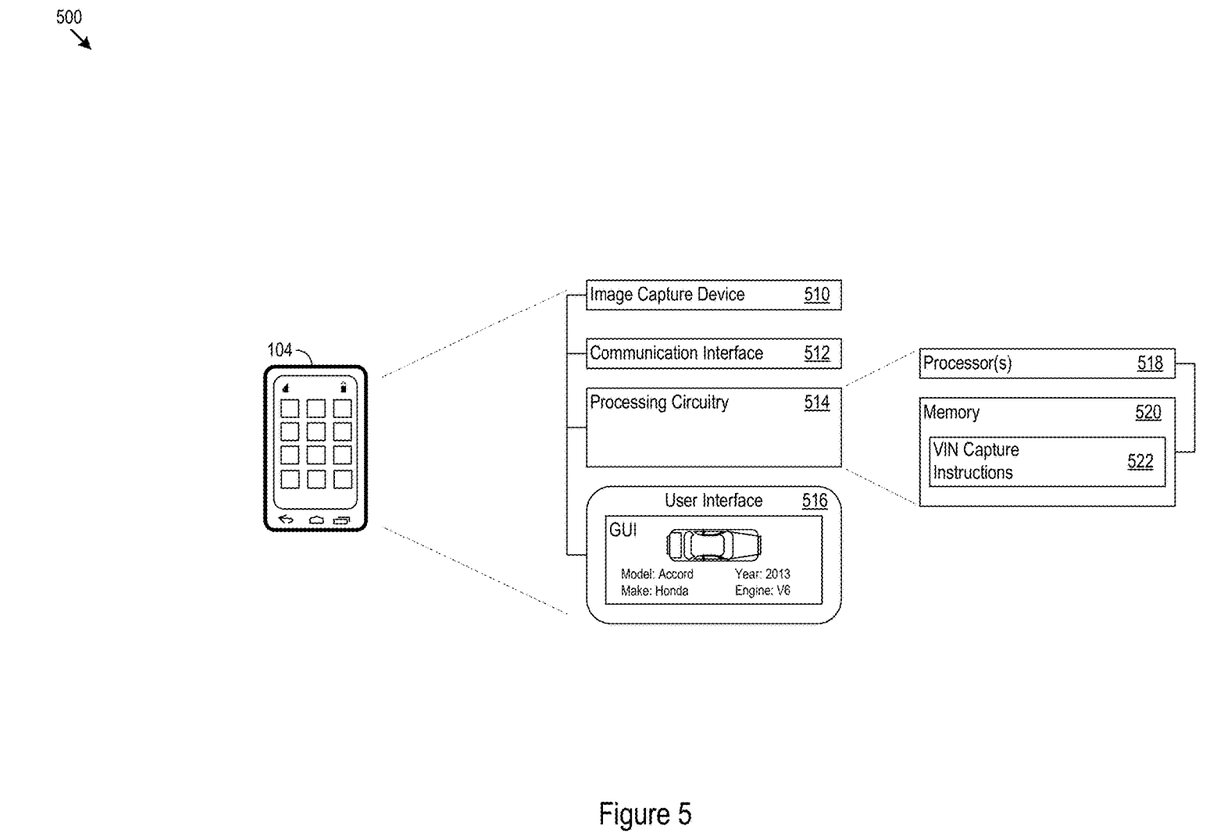
FIG. 5 shows an image of an electronic device for VIN capture.

FIG. 5 shows an example 500 of an electronic device 104 for VIN capture. The electronic device 104 includes an image capture device 510, a communication interface 512, processing circuitry 514, and a user interface 516. In one implementation, the processing circuitry 514 includes one or more processors 518 in communication with a memory 520. The memory 520 stores, for example, VIN capture instructions 522.

The processing circuitry 514 may instruct the image capture device 510 capture an image of indicia 122 positioned behind a reflective surface 120. The processing circuitry 514 may also obtain a clarified image of the captured image. In that regard, the processing circuitry 514 may process the captured image in any number of ways, including according to any of the image processing techniques discussed above, for example by iteratively processing the captured image to alternatively determine a resulting image x* and an interest region z to obtain the clarified image. As another example, the processing circuitry 514 may send the captured image for processing by an external system, e.g., the image processor 106. The processing circuitry 514 may perform other image processing on the captured image as well, including as examples, sharpening, deskewing, rotating, cropping, or other pre-processing and/or post-processing in conjunction with the image processing techniques described above in FIG. 2, 3, or 4.

The processing circuitry 514 may extract data indicative of the indicia 122 from the captured image and/or an obtained clarified image. When the indicia 122 captured by the electronic device 104 includes a VIN 126, the processing circuitry 514 may extract the VIN 126 from the initial image or clarified image. The processing circuitry 514 may use the VIN 126 to obtain vehicle data associated with the VIN 126. The processing circuitry 514, for instance, may send the VIN 126 to a VIN decoder 108 or query a vehicle database to retrieve the associated vehicle data. Upon receiving the associated vehicle data, the processing circuitry 514 may present the vehicle data through the user interface 516, including any of the vehicle data or information enumerated above. The processing circuitry 514 may additionally or alternatively present a vehicle image and the VIN 126 of the associated vehicle data as well.

When the processing circuitry 514 is unable to extract data indicative of the indicia 122 from the captured image and/or clarified image, the processing circuitry 514 may present an error indication through the user interface 516. For example, the error indication may specify that a VIN 126 could not be extracted from the captured image or from a subsequently obtained clarified image. The processing circuitry 514 may present an error indication that instructs a user of the electronic device 104 to capture a subsequent image of the indicia 122. The error indication may additionally instruct the user of the electronic device 104 to according to any number of image capture conditions, such as turning on or off a flash function of the image capture device 510, specifying a capture distance from the reflective surface 120 and/or indicia 122 to position the electronic device 104, specifying a capture angle, or other instructions. Upon capturing the subsequent image, the processing circuitry 514 may obtain a clarified image, extract data indicative of the indicia 122, obtain additional data associated with the indicia 122, and present the additional data.

Figure 6:
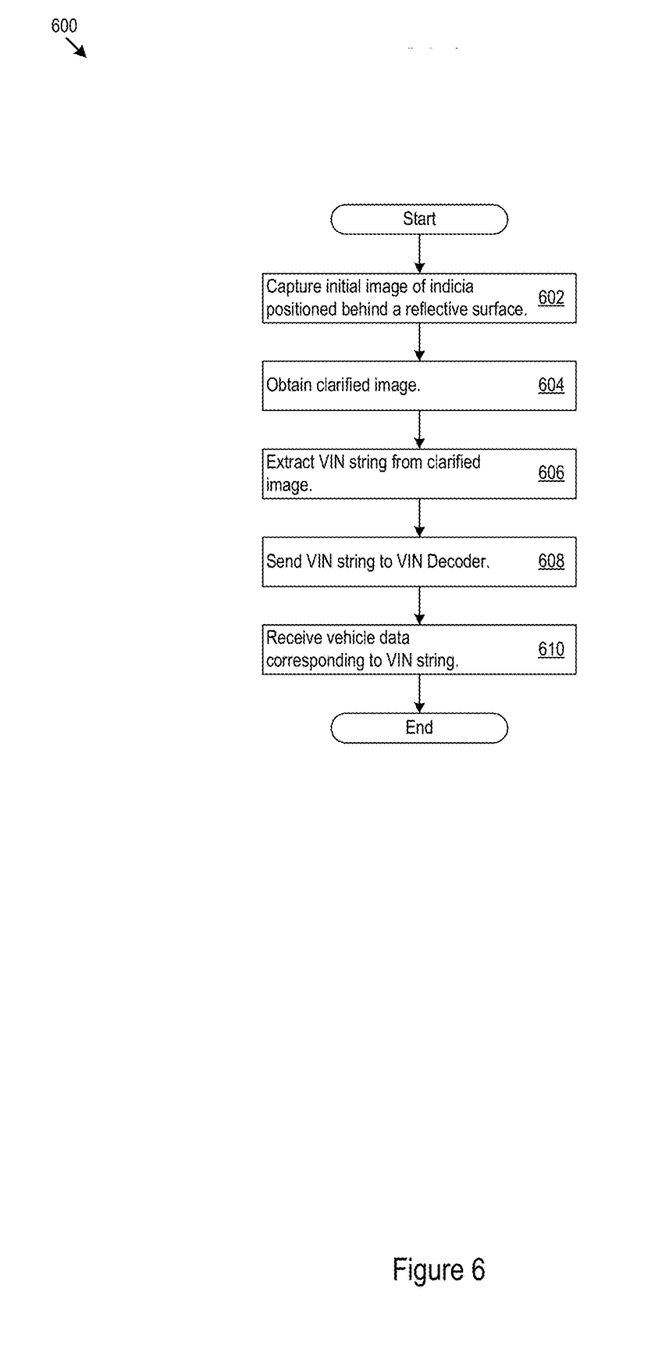
FIG. 6 shows an example of logic that may be implemented in hardware, software, or both.

FIG. 6 shows an example of logic 600 that may be implemented in hardware, software, or both. The electronic device 104 may, for example, implement the logic 600 in software as the VIN capture instructions 522.

The electronic device 104 captures an initial image 202 of indicia 122 positioned behind a reflective surface 120 (602) and obtains a clarified image 204 (604). To obtain the clarified image 204, the electronic device 104 may, for example, send the initial image 202 to for processing by external logic, e.g., the image processing system 106. In this example, the electronic device 104 may receive the clarified image 204 from the image processing system 106. In another example, the electronic device 104 may obtain the clarified image 204 by processing the initial image 202, including by employing any of the image processing techniques discussed above.

The electronic device 104 may extract data from the clarified image 204 indicative of the indicia 122. For example, the electronic device 104 may extract a character string that forms a VIN 126 from the clarified image 204 (606). The electronic device 104 may perform OCR processing or any other character recognition to extract the VIN character string from the clarified image 204. Then, the electronic device 104 may send the extracted VIN string to the VIN decoder 108 (608) and receive vehicle data corresponding to the VIN character string (610). The electronic device 104 may present the received data, e.g., through a user interface 516.

As one variation, the electronic device 104 may attempt to extract data indicative of the indicia 122 from the initial image 202, e.g., by performing OCR on the initial image 202. When the electronic device 104 is able to extract the data from the initial image 202, e.g., the VIN 126, the electronic device 104 may forego additional or subsequent processing of the initial image 202, e.g., obtaining a clarified image 204.

Although an example of extracting VIN information from behind a reflective surface 120 has been described, other images in other reflective media may be addressed using the above techniques. For example, indicia 120, e.g., alphanumeric, images, symbols of other sorts, or any combination thereof, may be captured and processed using any one or more of the techniques described above. For example, above described image processing techniques may be used in conjunction with extracting an employee identification data (e.g., a badge ID string, employee name, etc.) and accessing an employee database to retrieve associated data regarding the employee. Additional examples include, processing captured images of and/or retrieving associated data for driver's licenses, conference name cards, vehicle parking stickers, store merchandise barcodes, and more. Further examples include reading other types of barcodes, QR codes (e.g., from a laminated surface), capturing and and subsequent processing of images through glass (e.g., for security purposes to identify identity and/or number of passengers in a vehicle, etc.), capturing image(s) of projections such as conference slides, a tablet or computer screen, and more.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability described above may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the systems and methods have been described, it will be apparent to those of ordinary skill in the art that many more embodiments and implementations are possible within the scope of the systems and methods. Accordingly, the systems and methods are not to be restricted except in light of the attached claims and their equivalents.

What is claimed is:

1. A method comprising:
    in an electronic device comprising a processor, the processor:
        receiving an initial image of indicia positioned behind a reflective surface;
        processing the initial image to produce a first intermediate image by:
            removing a defocusing effect from the initial image, wherein removing the defocusing effect from the initial image comprises:
                convolving the initial image with a blur kernel to account for blur, reflection, or both, caused by the reflective surface, wherein the blur kernel comprises a distance variable specifying a distance between the indicia and the reflective surface;
        processing a portion of the initial image by:
            determining an interest region of the initial image; and
            texturizing the determined interest region;
        overlaying the processed portion of the initial image onto the first intermediate image to produce a resulting image; and
        extracting data from the resulting image representative of the indicia.

2. The method of claim 1, wherein processing the initial image to produce the first intermediate image further comprises converting the initial image to a gray scale image.

3. The method of claim 1, wherein processing the initial image to produce the first intermediate image further comprises increasing an image contrast of the initial image.

4. The method of claim 2 further comprising processing the resulting image to increase an effectiveness of indicia extraction by performing contrast enhancement, sharpening, or both on the resulting image.

5. The method of claim 1, wherein the interest region is set to a predetermined initial value.

6. The method of claim 1, wherein the predetermined initial value is none of, a predetermined portion of, or all of the initial image.

7. The method of claim 1, where texturizing the determined interest region comprises:
    processing the interest region according to a texture synthesis formula.

8. The method of claim 1, wherein removing the defocusing effect comprises:
    applying a detection algorithm to the initial image to determine an amount of defocus in the initial image, a distance between the indicia and the reflective surface, or an angle difference between an indicia surface the indicia is located on and the reflective surface; and
    supplying the determined amount to the blur kernel.

9. An electronic device, comprising:
    a communication interface configured to receive an initial image of indicia positioned behind a reflective surface; and
    processing circuitry configured to:
        process the initial image to produce a first intermediate image by:
            removing a defocusing effect from the initial image, wherein the processing circuitry, in removing the defocusing effect from the initial image, is configured to:
                convolve the initial image with a blur kernel to account for blur, reflection, or both, caused by the reflective surface, wherein the blur kernel comprises a distance variable specifying a distance between the indicia and the reflective surface;
        process a portion of the initial image by:
            determining an interest region of the initial image; and
            texturizing the determined interest region;
        overlay the processed portion of the initial image onto the first intermediate image to produce a resulting image; and
        extract data from the resulting image representative of the indicia.

10. The electronic device of claim 9, wherein the processing circuitry, in process the initial image to produce the first intermediate image, is further configured to convert the initial image to a gray scale image.

11. The electronic device of claim 9, wherein the processing circuitry, in process the initial image to produce the first intermediate image, is further configured to increase an image contrast of the initial image.

12. The electronic device of claim 9 wherein the processing circuitry is further configured to process the resulting image to increase an effectiveness of indicia extraction by performing contrast enhancement, sharpening, or both on the resulting image.

13. The electronic device of claim 9, wherein the processing circuitry, in processing portion of the initial image, is configured to set the interest region to a predetermined initial value.

14. The electronic device of claim 9, wherein the predetermined initial value is none of, a predetermined portion of, or all of the initial image.

15. The electronic device of claim 9, wherein the processing circuitry, in texturizing the determined interest region, is configured to:
    process the interest region according to a texture synthesis formula.

16. The electronic device of claim 9, wherein the processing circuitry, in removing the defocusing effect from the initial image, is further configured to:
    apply a detection algorithm to the initial image to determine an amount of defocus in the initial image, a distance between the indicia and the reflective surface, or an angle difference between an indicia surface the indicia is located on and the reflective surface; and
    supply the determined amount to the blur kernel.

17. A method comprising:
    in an electronic device comprising a processor, the processor:
        receiving an initial image of indicia positioned behind a reflective surface;

processing the initial image to produce a first intermediate image by:
  removing a defocusing effect from the initial image, wherein removing the defocusing effect from the initial image comprises:
    convolving the initial image with a blur kernel to account for blur, reflection, or both, caused by the reflective surface, wherein removing the defocusing effect comprises:
      applying a detection algorithm to the initial image to determine an amount of defocus in the initial image, a distance between the indicia and the reflective surface, or an angle difference between an indicia surface the indicia is located on and the reflective surface; and
      supplying the determined amount to the blur kernel;
processing a portion of the initial image by:
  determining an interest region of the initial image; and
  texturizing the determined interest region;
overlaying the processed portion of the initial image onto the first intermediate image to produce a resulting image; and
extracting data from the resulting image representative of the indicia.

* * * * *